(12) United States Patent
Kuznetsov

(10) Patent No.: US 11,616,378 B2
(45) Date of Patent: Mar. 28, 2023

(54) POWER TRANSFER SYSTEM WITH MULTIPLE ENERGY STORAGE MODULES

(71) Applicant: Raytheon Company, Waltham, MA (US)

(72) Inventor: Stephen Kuznetsov, Marlboro, MA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 16/437,750

(22) Filed: Jun. 11, 2019

(65) Prior Publication Data

US 2020/0395764 A1 Dec. 17, 2020

(51) Int. Cl.
*H02J 7/00* (2006.01)
*H02J 3/32* (2006.01)
(Continued)

(52) U.S. Cl.
CPC ............ *H02J 7/0024* (2013.01); *H01G 11/04* (2013.01); *H01M 10/46* (2013.01); *H01M 12/02* (2013.01);
(Continued)

(58) Field of Classification Search
CPC .......... H02J 7/0024; H02J 7/345; H02J 3/322; H02J 3/30; H01M 12/02; H01M 10/46;
(Continued)

(56) References Cited

U.S. PATENT DOCUMENTS 6,454,011 B1 * 9/2002 Schempf ............... E21B 19/143
166/381
9,373,963 B2 6/2016 Kuznetsov
(Continued)

FOREIGN PATENT DOCUMENTS

WO  2018004765 A2  1/2018
WO  WO-2018004765 A2 *  1/2018  ............ H02J 7/1423
WO  2019125723 A1  6/2019

OTHER PUBLICATIONS

Pending claims of co-pending U.S. Appl. No. 16/437,744, filed Jun. 11, 2019.
(Continued)

*Primary Examiner* — Daniel Kessie
*Assistant Examiner* — Brian K Baxter
(74) *Attorney, Agent, or Firm* — Renner, Otto, Boisselle & Sklar, LLP

(57) ABSTRACT

A power transfer system includes a series of energy storage modules (ESMs) or energy storage devices (ESDs) that are coupled together to be able to transfer power between one another, as well as receive power from a power source, such as an onshore power generator. The energy storage modules may be hybrid energy storage modules, each including an electrical-machine-inertial energy store and an electrochemical energy store. The energy storage modules are configured to receive constant-current DC or AC input from the power source, and are able to provide constant-current and constant-voltage output, either sequentially or simultaneously. The power transfer system allows the modules to operate independently or in conjunction with one another, should some of the connections of the system be broken. The energy storage modules may be used to provide power to underwater systems, for example sonar systems, weapons systems, or underwater vehicles.

19 Claims, 12 Drawing Sheets

(51) Int. Cl.
- *H01G 11/04* (2013.01)
- *H01M 10/46* (2006.01)
- *H01M 12/02* (2006.01)
- *H02J 3/30* (2006.01)
- *H02J 7/34* (2006.01)
- *H02K 7/02* (2006.01)
- *H02M 7/217* (2006.01)
- *H02P 9/00* (2006.01)
- *H04B 13/02* (2006.01)

(52) U.S. Cl.
CPC ............... *H02J 3/30* (2013.01); *H02J 3/322* (2020.01); *H02J 7/345* (2013.01); *H02K 7/025* (2013.01); *H02M 7/217* (2013.01); *H02P 9/007* (2013.01); *H04B 13/02* (2013.01)

(58) Field of Classification Search
CPC ......... H04B 13/02; H02P 9/007; H02K 7/025; H02M 7/217; H01G 11/04
See application file for complete search history.

(56) References Cited

U.S. PATENT DOCUMENTS

| | | |
|---|---|---|
| 9,531,247 B2 | 12/2016 | Kuznetsov |
| 9,531,289 B2 | 12/2016 | Kuznetsov |
| 9,543,781 B2 | 1/2017 | Asselin et al. |
| 9,667,232 B2 | 5/2017 | Kuznetsov |
| 9,824,805 B2 | 11/2017 | Wechlin et al. |
| 11,183,846 B2 | 11/2021 | Kuznetsov |
| 2006/0066104 A1* | 3/2006 | Melfi ............... H02J 9/066 290/1 A |
| 2014/0346868 A1* | 11/2014 | Kuznetsov ............ H02J 1/00 307/18 |
| 2015/0340860 A1 | 11/2015 | Tenca |
| 2016/0197600 A1 | 7/2016 | Kuznetsov |
| 2016/0336928 A1* | 11/2016 | Kuznetsov ............ H02J 3/30 |
| 2017/0256957 A1* | 9/2017 | Buiel ............... H02M 3/04 |
| 2019/0036336 A1* | 1/2019 | Kuznetsov ........... H02K 7/025 |
| 2019/0115758 A1* | 4/2019 | Orban ............... H02K 7/18 |
| 2020/0257009 A1* | 8/2020 | Pei ............... G01V 1/181 |

OTHER PUBLICATIONS

International Search Report and Written Opinion of corresponding International Application No. PCT/US2020/035161 dated Sep. 11, 2020.

\* cited by examiner

POWER TRANSFER SYSTEM WITH MULTIPLE ENERGY STORAGE MODULES

GOVERNMENT LICENSE RIGHTS

This invention was made with government support under contract HQ0727-16-D-0006 awarded by the Office of Naval Research (ONR). The government has certain rights in the invention.

FIELD OF THE INVENTION

The invention is the field of power transfer systems for transferring power to vehicles, such as undersea vehicles.

DESCRIPTION OF THE RELATED ART

One situation that recurs is the of how to transmit and control large power to sub-sea (e.g. at 10 km below surface) submersible effectors, unmanned underwater vehicles (UUVs), or sensor platforms that have large pulsating loads. Such situations may be further complicated by the transmission line to each sensors/effector being extremely long (e.g. 20 km). It would be desirable to have improved modulation and control for power transfer systems in such situations.

Accordingly there is room for improvement in this field of endeavor.

SUMMARY OF THE INVENTION

A power transfer system has a generator or other power source that supplies multiple energy storage modules, each capable of supplying constant-current and constant-voltage output power.

According to an aspect of the invention, a power transfer system includes: a power source; and multiple energy storage modules operatively coupled in series to the power source; wherein the energy storage modules are configured to receive constant-current DC input from the power source; wherein the energy storage modules are hybrid energy storage modules each with an electrical-machine-inertial energy store and an electro-chemical energy store; and wherein the energy storage modules are configured to provide both constant-current and constant-voltage output, either sequentially or simultaneously, drawing on energy from the power source and the electrical machine-inertial energy store and the electro-chemical energy store.

According to an embodiment of any paragraph(s) of this summary, the electrical-machine-inertial energy store includes a flywheel operatively coupled to a rotary induction machine.

According to an embodiment of any paragraph(s) of this summary, the electro-chemical energy store is also operatively coupled to the rotary induction machine, for providing bidirectional slip energy excitation power.

According to an embodiment of any paragraph(s) of this summary, the rotary induction machines are doubly-fed induction machines each with multiple output ports.

According to an embodiment of any paragraph(s) of this summary, at least some of the energy storage modules each allow for multiple outputs, able to provide energy to multiple devices coupled to the power transfer system.

According to an embodiment of any paragraph(s) of this summary, the power source is a combination of a power generator and an electronic regulator that provides for constant-current regulation of output power.

According to an embodiment of any paragraph(s) of this summary, at least one of the energy storage modules has a relatively low impedance output, and at least another of the energy storage modules has a relatively high impedance output.

According to an embodiment of any paragraph(s) of this summary, the power transfer system includes a transmission line connecting the energy storage modules in series; and one or more bypass switches that allow selective bypass of one of the energy storage modules, and that permit continuous operation of transmission lines and the power transfer system without interruption.

According to an embodiment of any paragraph(s) of this summary, the power transfer system includes an AC-to-DC rectifier that changes an AC polyphase output from the power source to DC power; and a transmission line for transmitting the DC power to the energy storage modules.

According to an embodiment of any paragraph(s) of this summary, the power transfer system includes a transmission line for transmitting the DC signal to the energy storage modules.

According to an embodiment of any paragraph(s) of this summary, the transmission line is bidirectional and is configured to receive electrical power from the energy storage modules and transfer the electrical power back to the power source.

According to an embodiment of any paragraph(s) of this summary, the transmission line is at least 500 m long.

According to an embodiment of any paragraph(s) of this summary, the transmission line is at least partially underwater.

According to an embodiment of any paragraph(s) of this summary, the power transfer system further includes regenerative DC-to-AC converters for converting the DC power on the transmission lines to an AC input for the energy storage modules, and for converting AC power to DC power, for transmission of the DC power on the transmission lines.

According to an embodiment of any paragraph(s) of this summary, the power transfer system further includes an AC-to-AC power converter that changes constant-voltage AC from the power source to constant-current AC for injection into an AC transmission line that feeds one or more of the energy storage modules, which are in series.

According to an embodiment of any paragraph(s) of this summary, the power transfer system is bidirectional, configured to permit energy from any one or more of the energy storage modules to be returned to the power source.

According to another aspect of the invention, a method of transferring power, wherein the method includes: transferring power to multiple energy storage modules coupled together in series, wherein the multiple energy storage modules receive constant-current DC input from the power source; storing kinetic energy in electrical-machine-inertial energy stores and storing electro-chemical energy in electro-chemical energy stores of the energy storage modules; and providing constant-current and constant-voltage output from the energy storage modules, wherein the providing the output includes drawing energy from the power source and from the electrical-machine-inertial energy stores and the electro-chemical energy stores.

According to an embodiment of any paragraph(s) of this summary, the method further includes bidirectionally transferring energy from one of the energy storage modules to another of the energy storage modules.

According to yet another aspect of the invention, a power transfer system includes: a power source; and multiple energy storage modules operatively coupled in series to the power source; wherein the energy storage modules each include a master doubly-fed induction machine (DFIM), and a pilot DFIM operatively coupled together, and respective flywheels operatively coupled to the master DFIM and the pilot DFIM.

According to an embodiment of any paragraph(s) of this summary, each of the energy storage modules has an ultra-capacitor energy storage device operatively couple to the master DFIM and the pilot DFIM.

According to an embodiment of any paragraph(s) of this summary, the pilot DFIMs have rotor polyphase windings that provide input power to stator windings of respective of the master DFIMs, and provides an amplification of power.

According to an embodiment of any paragraph(s) of this summary, the pilot DFIMs have rotor polyphase windings that provide input power to stator windings of respective of the master DFIMs.

According to an embodiment of any paragraph(s) of this summary, output from the stator windings of the master DFIMs is sent to rectifiers of respective of the energy storage modules.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

Figure 1:
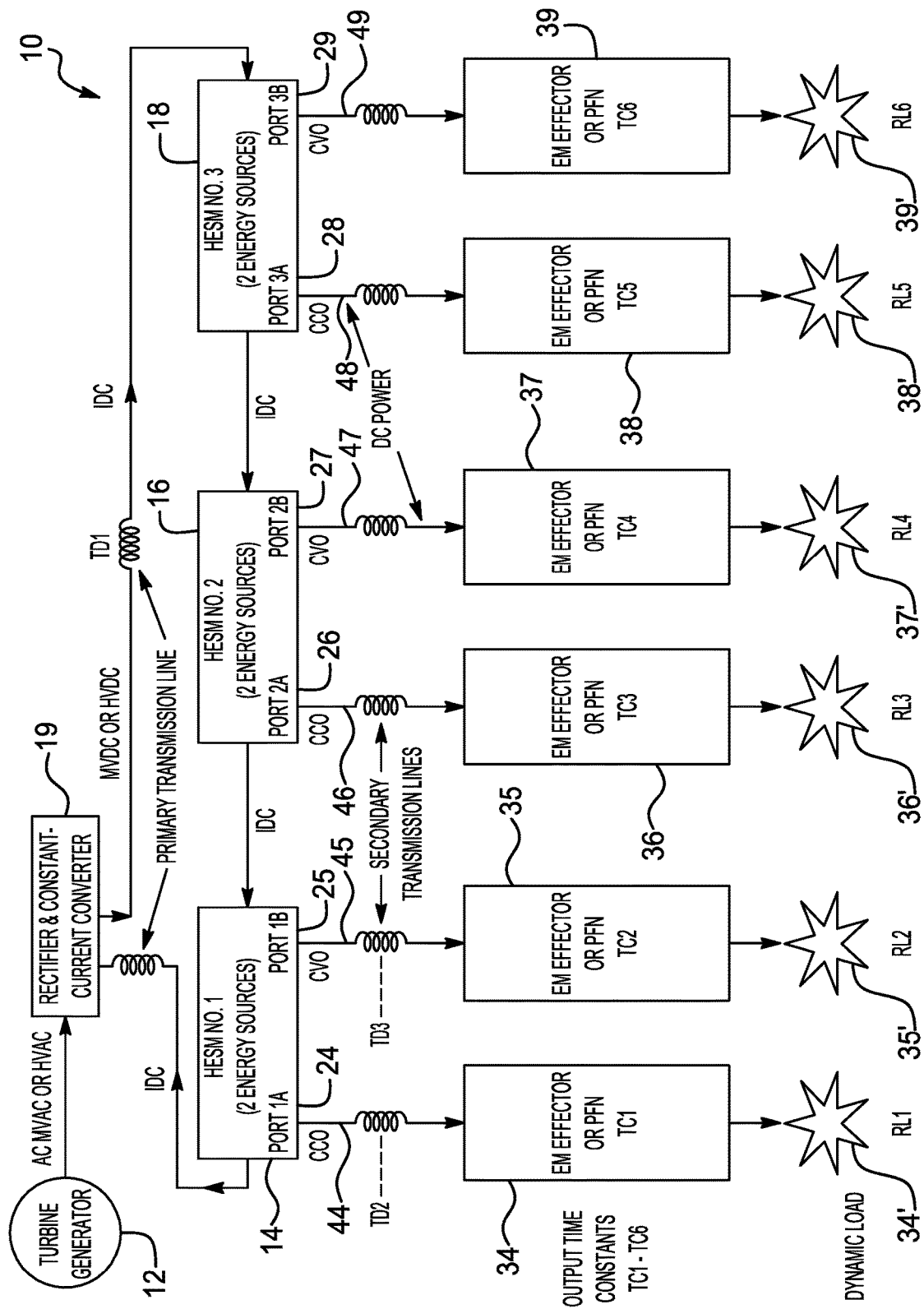
FIG. 1 is a schematic diagram of a power transfer system in accordance with an embodiment of the invention.

A power transfer system includes a series of energy storage modules (ESMs) or energy storage devices (ESDs) that are coupled together to be able to transfer power between one another, as well as receive power from a power source, such as an onshore power generator. The energy storage modules may be hybrid energy storage modules, each including an electrical-machine-inertial energy store and an electro-chemical energy store. The energy storage modules are configured to receive constant-current DC or AC input from the power source, and are able to provide constant-current and constant-voltage output, either sequentially or simultaneously. The power transfer system allows the modules to operate independently or in conjunction with one another, should some of the connections of the system be broken. The energy storage modules may be used to provide power to underwater systems, for example sonar systems, weapons systems, or underwater vehicles. One potential advantage of the power transfer system is its ability to accommodate large recurrent pulsed power loads such as from an electromagnetic effector, while limiting the instantaneous power draw from the source power and buffer the source so as not to physically damage the power generator or its transmission line from overload currents or its heating effects. Another potential advantage is the ability to limit the transient recovery voltage (TRV) that appears on a transmission system that otherwise could have a damaging effect on cables or source apparatus.

In an embodiment the transfer system may be used to provide power for high-power submersible sonar arrays or large electromagnetic (EM) effector stations. The power source may be a generator such as a turbine generator, a solar generator, or a wind generator, to give a few examples. The power source may be located a far distance from the energy storage devices (ESDs). Further, the ESDs may be located a far distance from the final load, with high efficiency. The ESD may be a single-stage energy storage module, or a hybrid storage module consisting of two substantially different types of energy stores, for example an ultra-capacitor in combination with a rotating machine-flywheel set, each with different time constants and/or electrical impedances. The link from the energy source of the ESD may be a constant-current (CC) loop rather than a constant-voltage line. This is advantageous for transmission of large blocks of electrical energy over distances of hundreds to thousands of meters in an environment such as undersea ocean. In an embodiment the system has multiple ESD stations fed by a high voltage DC constant-current loop, with all the ESD stations in series for their input power, and having either constant-voltage DC or constant-current DC output to suit a variety of different loads including pulsed power loads. The system supports loads which are either pulsed power, steady state power or a combination of the two such as sonar and autonomous underwater vehicles (AUV).

A further advantage of the power transfer system is the transformation of system impedances. The transmission line from source to ESD has a relatively high impedance whereas the ESD output and its typically shorter transmission line operate at a lower impedance and hence a higher current level consistent with load requirements. Power conditioning apparatus, described below, produces the impedance transformation efficiently and compactly.

The system may involve a change in time constant from input line to output line. For instance the high-voltage DC input constant-current line may have a longer time constant ($T_{DCI}$) than the output constant-current time constant ($T_{DCO}$) or output constant-voltage time constant ($T_{DVO}$) by at least a factor of two. The shorter time constant of the output circuit or loop facilitates rapid delivery of pulsed power to an electromagnetic effector sub-system such as pulse forming network (PFN) or pulse shaping network (PSN) as shown herein. Aspects described herein allow for a 10:1 change in time-constant from input to output line, albeit there is typically a corresponding change in voltage level in a preferred embodiment.

FIG. 1 shows a high-level configuration of a power transfer system 10 that includes a power generator 12, and a series of energy source devices or modules 14, 16, and 18. In an example embodiment the power generator 12 may be a turbine generator set (TG) that transmits power as constant-current DC over a long transmission distance, such as 500 m or more, or 2000 m or more, to the multiple energy storage devices 14, 16, and 18. Power from the power generator 12 may be sent as medium-voltage AC (MVAC) or high-voltage AC (HVAC), and converted to DC in a rectifier and constant-current converter 19. The energy storage modules or devices 14-18 may be hybrid energy storage devices (HESMs), each having multiple energy stores, including different types of stores, for instance each including an electrical-machine-inertial energy store and an electro-chemical energy store. Each of the HESMs 14-18 may have at least two output ports, one is a constant-current output (CCO) and the other a constant-voltage output (CVO). In the illustrated embodiment the HESM 14 has output lines 24 and 25, the HESM 16 has output lines 26 and 27, and the HESM 18 has output lines 28 and 29. The different output lines may be used for feeding separate EM sensors or EM effector loads 34 and 35, 36 and 37, and 38 and 39. The output lines may also be used for feeding separate dynamic loads 34' and 35', 36' and 37', and 38' and 39'. Transmission lines 44 and 45, 46 and 47, and 48 and 49, corresponding to the respective output lines 24-29, may have transmission distances on the order of hundreds or thousands of meters. The main loop 50 has a main loop current $I_{DC}$ is common to all HESM units 14-18 at their input electrical port or winding.

Figure 2:
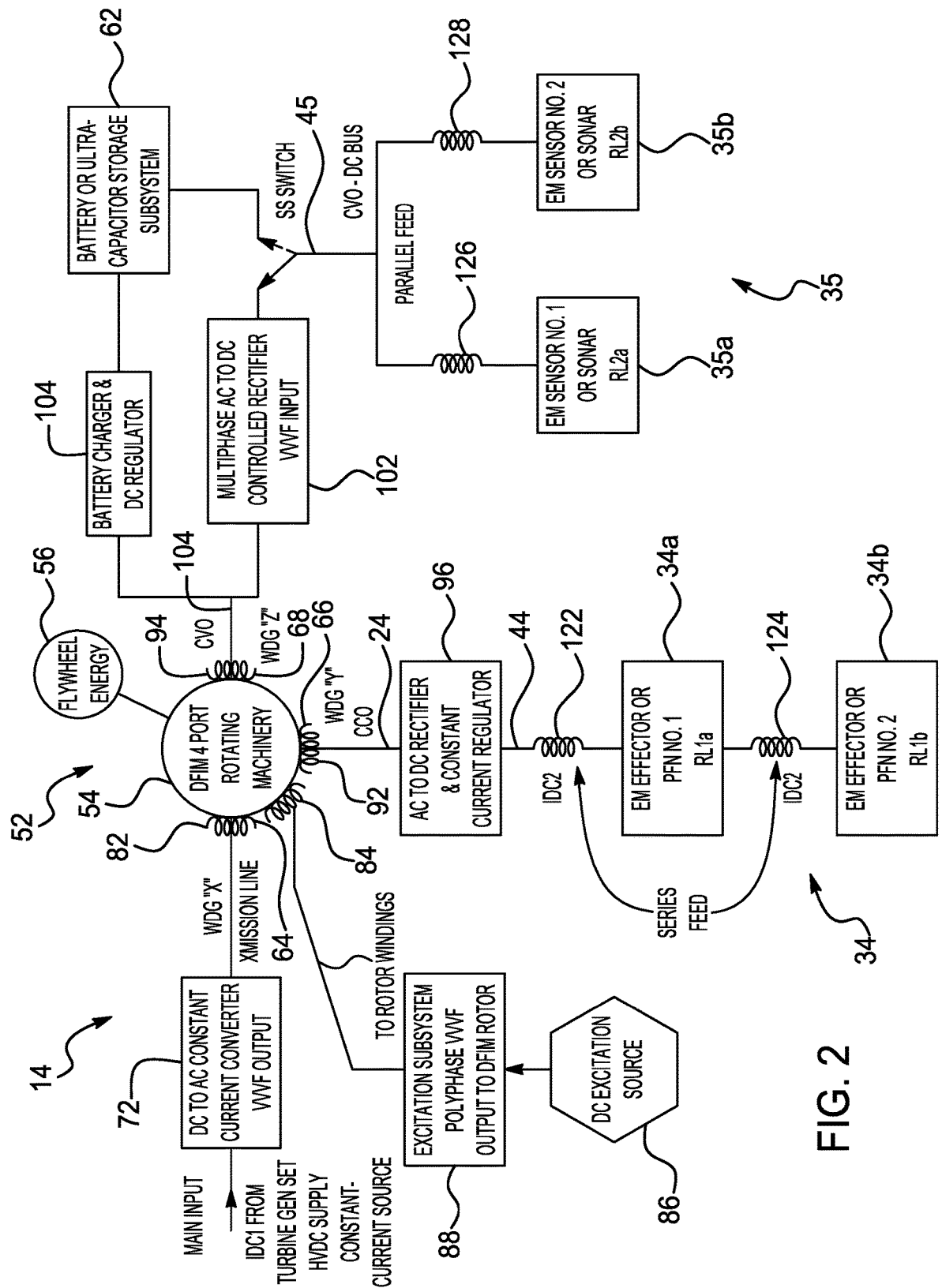
FIG. 2 is a schematic diagram showing details of a portion of the power transfer system of FIG. 1.

FIG. 2 shows further details of the HESM 14. It will be appreciated that the other HESMs 16 and 18 (FIG. 1) may have similar features. In addition, it should be understood that there may be a greater or lesser number of the energy storage modules than in the illustrated embodiment.

The constant-current output line 24 is fed by the output of a rotating AC electrical machine-flywheel set 52, consisting of a rotating electrical machine 54 and a flywheel or other mechanical energy store 56. For example, the flywheel may be a high-speed flywheel, capable of rotating at 10,000 rpm or more. The set 52 yields constant-current output due to a combination of overall machine configuration and a special polyphase excitation system for the machine. The constant-voltage output line 25 is derived from the tertiary electrical machine port of winding 94 feeding the load 35, though an intermediate energy storage 62 is present. The constant current output feeds the load 34 and has time constant $T_{C1}$. FIG. 2 shows an example layout for the ESD 14 when configured as a hybrid energy storage module whereby the electrical machine has a constant-current AC input 64 which is derived from the HVDC constant current line, and has multiple output windings or ports 66 and 68, which allow a simultaneous or separate combination of CCO and CVO from a common electrical machine stator assembly 54.

Power from the power generator 12 (FIG. 1) or other of the modules 16 and/or 18 arrives in DC and passes through a DC-to-AC converter 72, which provides a variable-voltage, variable-frequency (VVVF) output to the rotating electrical machine 54, at a constant-current main AC input winding 82, with a time constant $T_{C3}$ and an impedance $Z_3$. The rotating electrical machine 54 has another input winding 84, which receives input from a DC excitation source 86, such as a battery, with output from the excitation source 86 passing through an excitation regulator and DC/AC converter 88, to provide VVVF output to the winding 84. The winding 84 has a time constant $T_{C4}$ and an impedance $Z_4$. The winding 84 is typically a rotor polyphase winding. Current in this winding is dependent on the slip value σ is defined as $\sigma=(\omega_s-\omega_r)/\omega_s$, where $\omega_s$ is synchronous speed and $\omega_r$ is rotor speed.

A secondary winding 92 is connected to the constant-current output line 24, with the winding 92 having an electrical time constant $T_{C1}$ and an impedance $Z_1$. A winding 94 is connected to the constant-voltage output line 25, with the winding 94 having an electrical time constant $T_{C2}$ and an impedance $Z_2$.

After leaving the winding 92 the constant-current output moves along the line 24 through an AC-to-DC rectifier and constant-current regulator, in block 96. From there it provides power along the transmission line 44 to loads 34a and 34b (e.g., EM effectors or pulse forming networks (PFNs)), which are coupled together in series. The PFN serves to sharpen or narrow the pulse width of the current supplied to the load 34b.

After leaving the winding 94 the constant-voltage output moves along the line 25 to an AC-to-DC controlled rectifier 102, which is in parallel with a battery charger 104 that is coupled to the energy storage device 62, such as a battery or electro-static ultra-capacitor. From there it provides power along the transmission line 45 to the loads 35a and 35b (e.g., EM effectors or pulse forming networks (PFNs)), which are coupled in parallel to a feed, the line 45.

In one operating mode, the time constants and impedance levels may be ordered as followed (for improved performance):

$$Z_4<Z_3<Z_1<Z_2 \qquad (1)$$

$$T_{C4}<T_{C3}<T_{C1}<T_{C2} \qquad (2)$$

The transmission line impedances can be large due to the long distances between HESM units and loads. If we define the constant-current transmission line impedance with reference to FIG. 2 as $Z_{L1}$ and $Z_{L2}$ in respective segments 122 and 124, the system allows operation in a CCO mode with the following relationships $$Z_{L1} \geq Z_{10} \quad (3)$$

$$Z_{L2} > Z_{10} \quad (4)$$

$$Z_{L1} + Z_{L2} > Z_{10} \quad (5)$$

where $Z_{10}$ is the machine's effective output impedance per phase subsequent to rectification and regulator action.

For the machine CVO, the EM sensor loads arranged in parallel, constant voltage input, then it is clear the two corresponding transmission line impedances are limited as follows:

$$Z_{L3} \sim Z_{30} \quad (6)$$

$$Z_{L4} \sim Z_{30} \quad (7)$$

$$(Z_{L3} * Z_{L4})/(Z_{L3} + Z_{L4}) < Z_{30} \quad (8)$$

where $Z_{L3}$ and $Z_{L4}$ are the impedances of the transmission lines 126 and 128, respectively, and where $Z_{30}$ is the effective impedance per phase of the electrical machine or the ultra-capacitor output after the regulator or rectifier of the machine windings. With regard to $Z_{L3}$ and $Z_{L4}$, the indication that they are approximately the same as $Z_{30}$ may be taken to mean that $Z_{L3}$ and $Z_{L4}$ are within 50% of $Z_{30}$, although this range should be considered as non-limiting.

Figure 3:
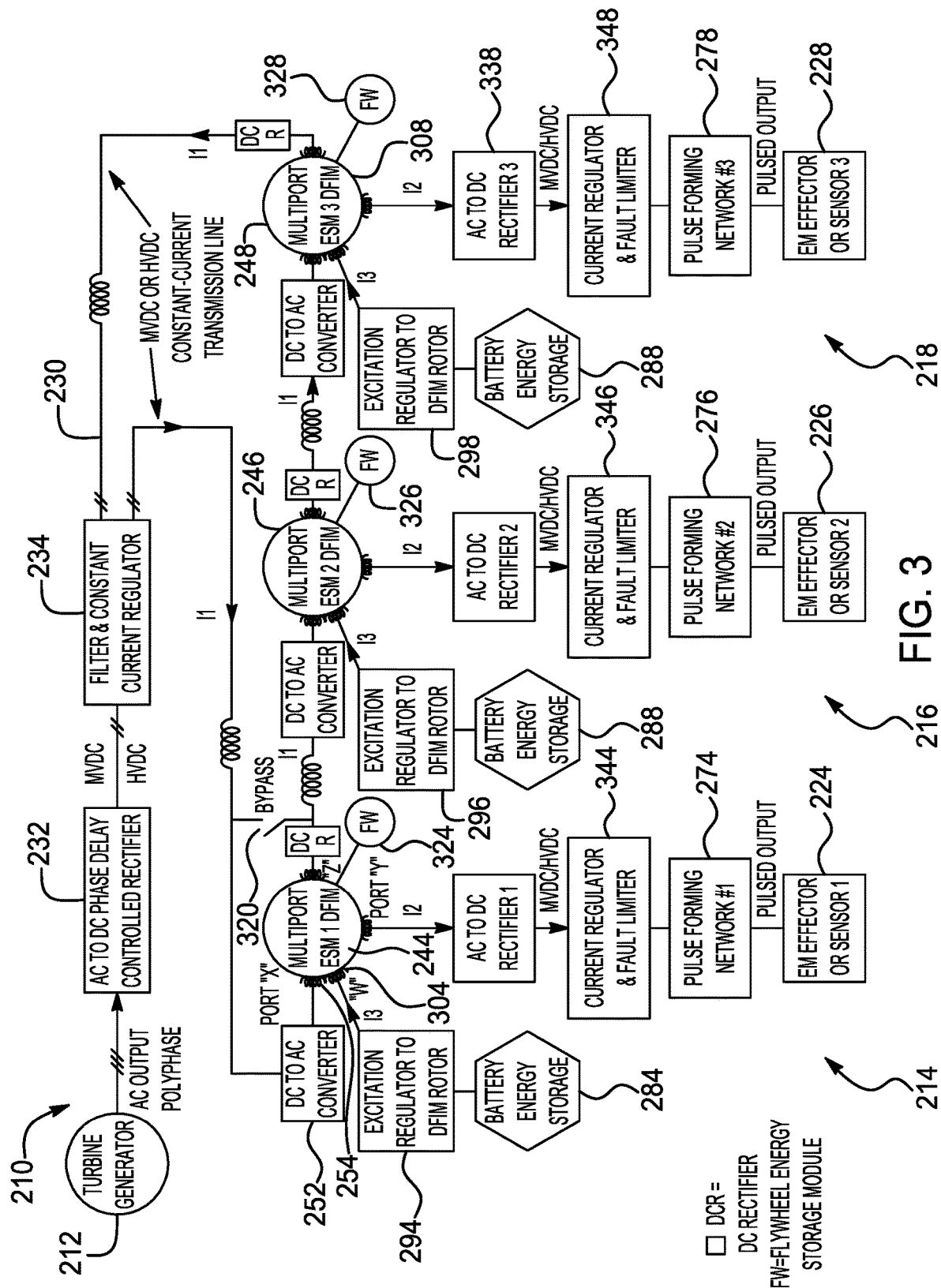
FIG. 3 is a schematic diagram of a power transfer system in accordance with an alternate embodiment of the invention.

FIG. 3 shows a power transfer system 210 that includes a generator 212 operatively coupled to a series of energy storage modules (ESMs) 214, 216, and 218. The ESMs 214, 216, and 218 provide constant-current output to respective separate EM effectors 224, 226, and 228. The ESMs 214-218 and fed by a common long-distance transmission line 230 from the main energy source or turbine generator 212. The transmission line 230 may be a high-voltage DC (HVDC) or medium-voltage DC (MVDC) transmission line. An AC/DC phase delay controlled rectifier 232 may be used to convert the AC polyphase output from the generator 212 to HVDC or MVDC. A filter and current regulator 234 may also be used downstream of the rectifier 232, to provide the constant-current HVDC or MVDC transmitted along the transmission line 230.

In contrast to the system 10 (FIG. 1), in the system 210 there is no use of battery or ultra-capacitor subsystems, except in an excitation circuit forming current I3. In the system 210 the rotating machines 244, 246, and 248 operate with constant-current input, constant-current output, and a constant-current rotor excitation subsystem. The use of rotating machinery with a discrete rotor excitation circuit supplied by regulators 294, 296, and 298 provides maximum operational flexibility and also enhances overall system safety in the event of load faults. For example the transmission line 230 may be a total of 9000 m long, with (in a non-limiting example) with segments of 2000 m between adjacent of the ESMs 214-218, and segments of 2500 m between the generator 212 and the ESMs 214-218.

Each of the ESMs 214-218 incorporates a variable-voltage variable-frequency (VVVF) DC-to-AC converter, such as the converter 252 for the ESM 214, to convert the medium or high voltage DC transmission line power into a polyphase AC input for each machine winding, such as an input winding 254 of the rotary machine 244 for the ESM 214. The machine winding may be 3-phase, 6-phase, 9-phase, 12-phase or 15-phase, to give non-limiting examples. The rotary electrical machines 244, 246, and 248 all operate at identical input AC current levels in one embodiment of this arrangement. Consequently the output pulse-forming networks (PFNs) 274, 276, and 278 may be at the same charging rate, since the PFNs 274, 276, and 278 may be equal in size and energy rating.

In a situation where the output charging rates to the PFNs 274, 276, and 278 or to the effectors 224, 226, and 228 vary in current and/or timing (not simultaneous), the energy sources or stores (batteries or other chemical energy storage) 284, 286, and 288, acting through regulators 294, 296, and 298, may provide a closely-controlled field current to excitation windings 304, 306, and 308 of the machines 244, 246, and 248. This may involve providing a field current I3, acting as a difference current to compensate for the different loads in the ESMs 214-218. In one embodiment the electrical machines 244, 246, and 248 are wound-rotor induction machines with a polyphase rotor and polyphase excitation supply from a VVVF inverter. An important criterion is the phasor equality that:

$$I_1 + I_3 = I_2 \quad (9)$$

where $I_1$ is the magnetomotive force (MMF) phasor of the main input current loop, $I_2$ is the MMF phasor of the load output current to the PFNs 274, 276, and 278, and I3 is the MMF phasor of the field excitation or regulator current.

The phasor $I_3$ may be injected into the rotor circuit at an arbitrary phase angle and thus $I_3$ can be in phase or out of phase with respect to the $I_1$ phasor. The $I_3$ current (MMF) from the field current regulator may be set at a different voltage/current level from the main input/output currents and an amplification of the field power occurs in the wound-rotor induction machine. The amplification can be on the order of 100, and thus a change in field power of 1 kW can cause output power to swing 100 kW. Closed loop control of the wound-rotor induction machine is well known in prior art and forms a stable feedback control system. Response times of 10 ms to 100 ms are common.

FIG. 3 also shows a shunt-bypass switch 320 across the first ESM 214. This enables bypass of the ESM 214 in the event of a malfunction and allow the other two ESMs 216 and 218 to maintain normal operation. In one embodiment the field excitation supplies/regulators 294, 296, and 298 require 2% of the output power of each of the ESMs 214, 216, and 218. This power may be provided from DC battery supplies 284, 286, and 288, which may be charged by a pilot generator on the main flywheel shaft of the flywheels 324, 326, and 328. The batteries 284-286 are examples of chemical energy stores or sources, and the flywheels 324-328 are examples of mechanical-inertial energy stores or sources.

Three general types of electrical machines may be used for the principal electro-dynamic conversion devices: wound-rotor induction machines, cage-rotor induction machines, and permanent magnet rotor synchronous machine (e.g., the rotary machines 54, 244, 246, 248, 400, 524, 526, 712, 714, 716, 718, 922). Wound-rotor machines provide the maximum flexibility for the ESMs (or HESMs) and are able to operate in a bidirectional power flow mode, which is advantageous. The use a poly-phase excited rotor winding permits a constant current output of the machine with minimal use of power electronic converter apparatus under wide variations in shaft speed due to the reduction of kinetic energy of the integral flywheel. For example, the system 210 may provide for a reduction in shaft speed to 50% of the baseline or 25% of the full kinetic energy whereby rotor excitation is boosted in current and the output winding voltage/frequency ratio is maintained to yield a near constant magnetic flux in the machine airgap.

The system 210 has additional components not discussed above. AC/DC rectifiers 334, 336, and 338, and current regulators and fault limiters 344, 346, and 348, are between the machines 244, 246, and 248 and the PFNs 274, 276, and 278. The rectifiers 334, 336, and 338 may also act as fault limiters. That is, in the event of a fault in the PFNs or loads, the AC/DC controlled rectifiers using thyristor or insulated-gate bipolar transistor (IGBT) power switches can be phased back to a zero conduction angle, and thus reduce fault currents to a zero level.

Figure 4:
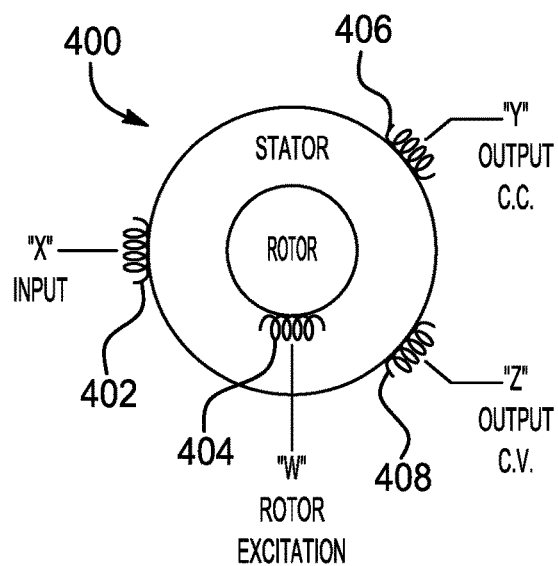
FIG. 4 is a schematic diagram of a rotary machine of the power transfer system of FIG. 3.
Figure 5:
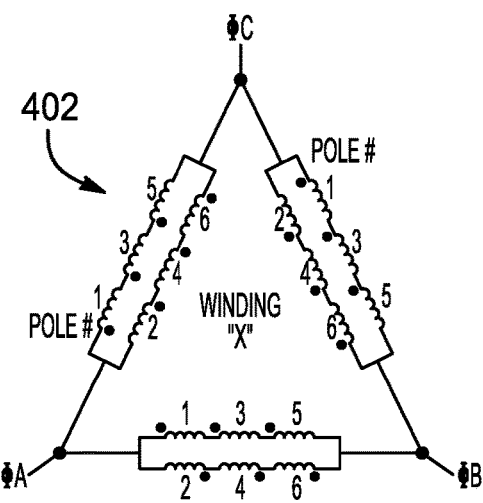
FIG. 5 is a wiring diagram of a winding of the rotary machine of FIG. 4.
Figure 6:
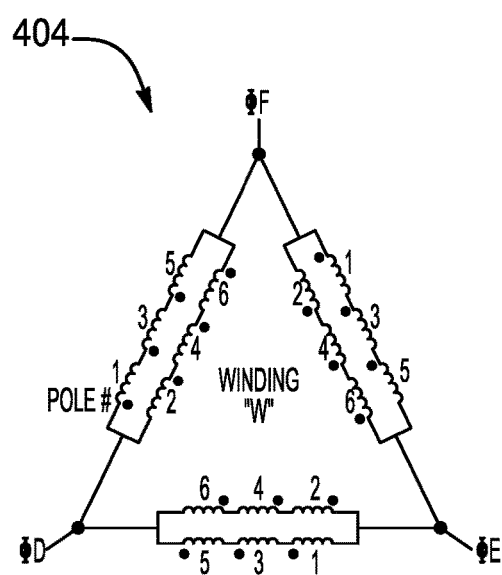
FIG. 6 is a wiring diagram of another winding of the rotary machine of FIG. 4.
Figure 7:
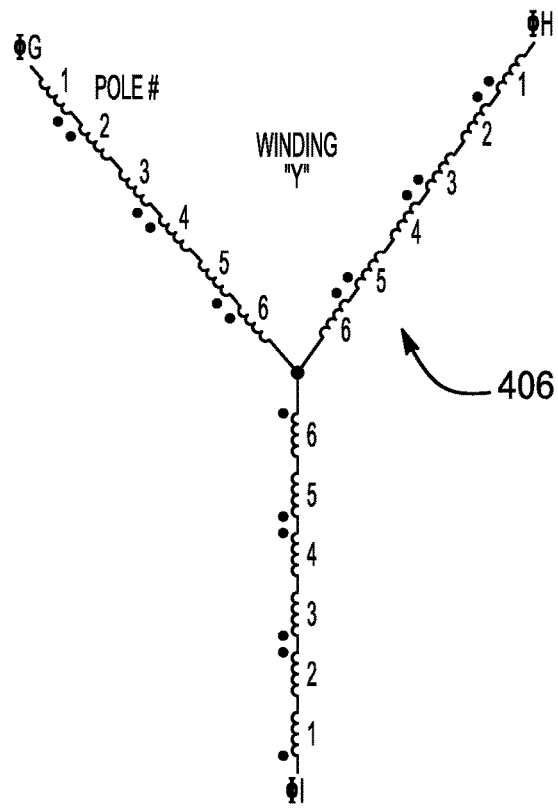
FIG. 7 is a wiring diagram of yet another winding of the rotary machine of FIG. 4.
Figure 8:
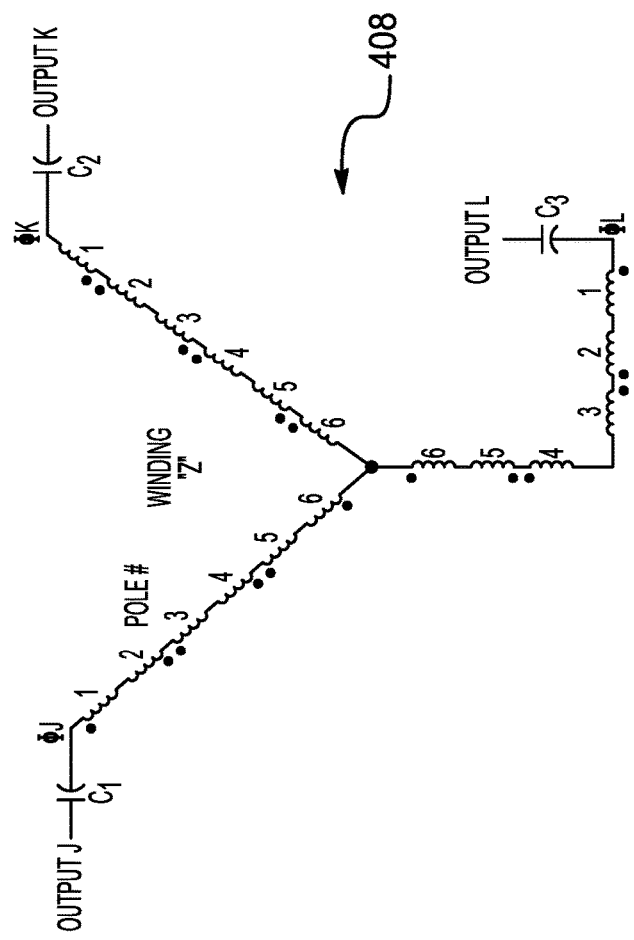
FIG. 8 is a wiring diagram of still another winding of the rotary machine of FIG. 4.

FIG. 4 shows a schematic diagram of an example wound-rotor or doubly-fed induction machine 400 with an input winding 402, a rotor excitation winding 404, a constant-current output winding 406, and a constant-voltage output winding 408. FIGS. 5-8 show examples of such windings for an embodiment of the machine as a six-pole wound rotor induction machine, with three stator windings (the windings 402, 406, and 408) and one rotor winding, the winding 404. The machine 400 is suitable for HESM with both constant-current and constant-voltage output for either steady state or pulsed loads.

Each of the windings 402-408 is polyphase. The excitation winding 404 (FIG. 6) baseline is a 3-phase delta winding. Windings 402, 406, and 408 (FIGS. 5, 7, and 8, respectively) can be higher order windings, such as 6 phase, 9 phase, or 12 phase, to reduce machine harmonics, although the examples shown are 3-phase windings.

The frequency f applied to the winding 402 (FIG. 5) is related to shaft speed N as $$f=p*N/(60(1-o'))  \quad (11)$$

where N is the shaft speed (RPM), p is the pole pairs, and o' is per unit slip of the induction machine.

The output winding 406 (FIG. 7) is a series connected wye winding that yields constant current when the input winding 402 (FIG. 5) is fed by constant current of the input source. The impedance level of the winding 402 can be independent of that of the winding 406, to suit the application. The impedance of each winding can be calculated approximately as:

$$Z_y = k_y N_y^2 P_y \omega \quad (12)$$

$$Z_x = k_x N_x^2 P_x \omega \quad (13)$$

where $k_x$ and $k_y$ are design constants, standard parameters related to configuration, such as saturation factors and distribution factors, N is the number of series turns/phase, P is the magnetic permeance of each magnetic circuit, and ω is the radian electrical frequency of magnetic flux in the core.

The constant-voltage winding 408 (FIG. 8) has a series power capacitor per phase which ensures the winding delivers a constant-voltage output characteristic over a broad range of excitation magneto-motive force. The capacitors C1, C2 and C3 are matched to each winding to create a resonant circuit and null-out the main leakage reactance component of each machine winding. Having the windings 406 and 408 as wye connected minimizes the circulating currents in each, yet the input winding 402 as a delta winding configuration ensures that triple harmonics are cancelled.

It should be appreciated that the layouts shown in FIGS. 5-8 for the windings 402-408 are only examples showing one possible way of configuring the windings. A wide variety of alternative configurations are possible.

Figure 9A:
FIG. 9A is a circuit diagram showing an example of a pulse forming network for use with the power transfer system of FIG. 3.
Figure 10:
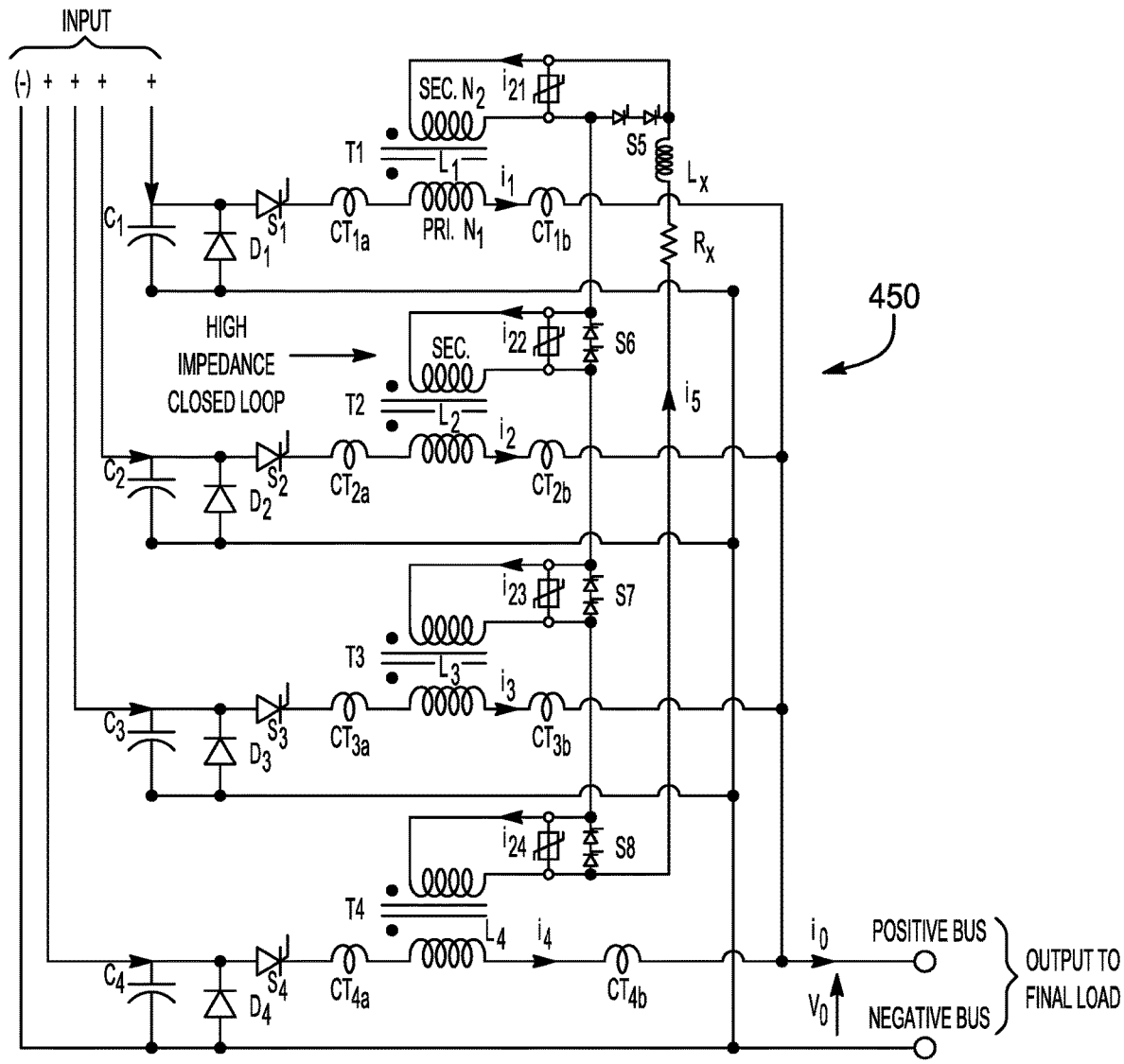
FIG. 10 is another circuit diagram showing details of an example of a pulse forming network for use with the power transfer system of FIG. 3.

An example of the arrangement of a pulse forming network (PFN) 450 as a load for the winding 406 (FIG. 7) is shown in FIGS. 9A and 10. FIG. 9A is a cascade arrangement of high power PFN stages whereby S4 is fired first followed by S3, then S2 and last S1. The PFN 450 is most effective in delivering a constant-current output with a controlled rapid rise time. Output electronic switches S1-S4 may be a thyristor, MOSFET, or IGBT, which are commanded to fire when load current is required. Sequential modulation of the output pulse by these switches occurs. Diodes D1-D4 protect the high energy DC capacitors C1-C4 from reverse voltage. The requirement for a constant current charging cycle is met as initially the PFN 450 is charged by constant-current through inductor $L_o$ and after a specific energy charge is given, the charging mode is changed to a constant-power mode for the remainder of the charging cycle.

Figure 9B:
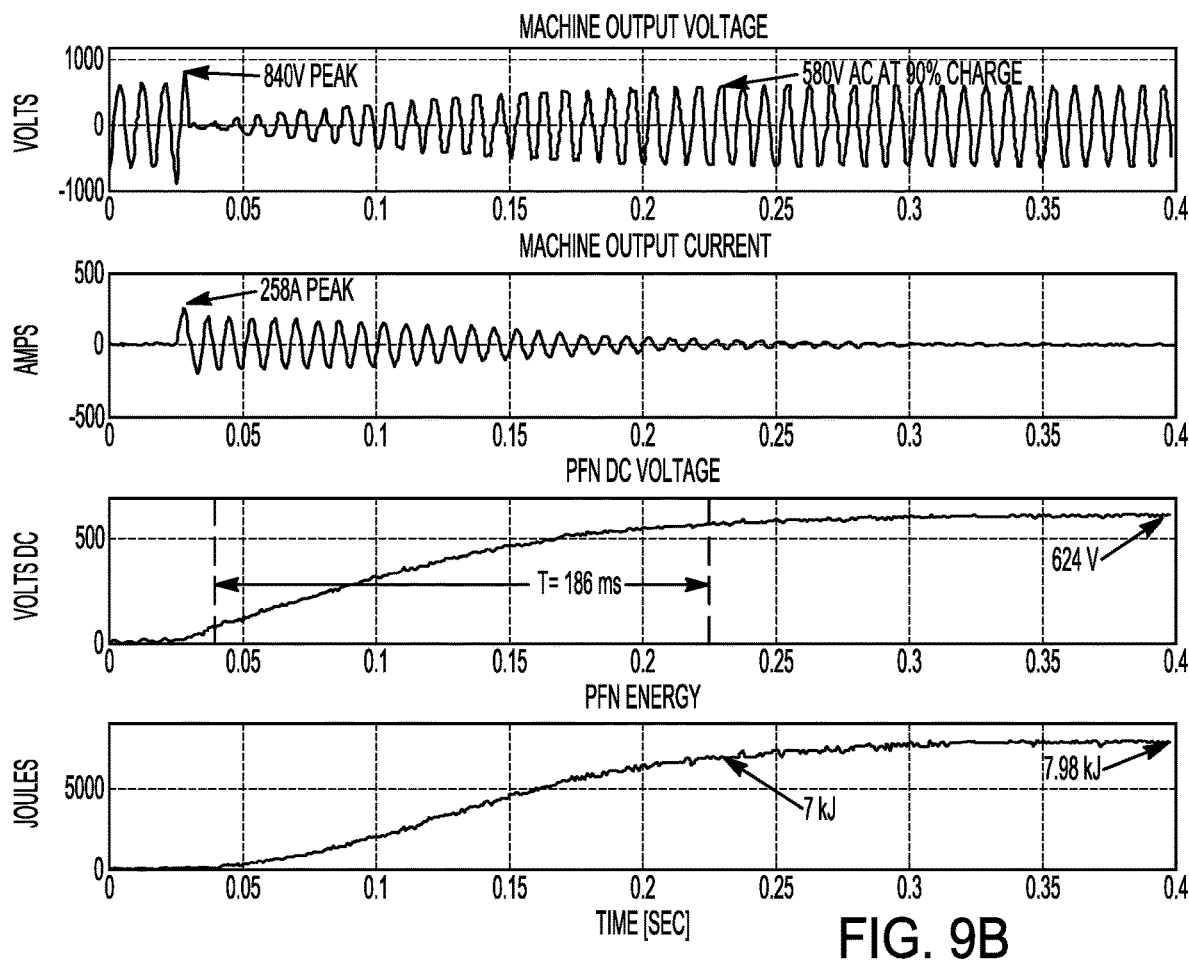
FIG. 9B shows an example of performance of a DFIM electrical machine, part of the power transfer system of FIG. 3.
Figure 9C:
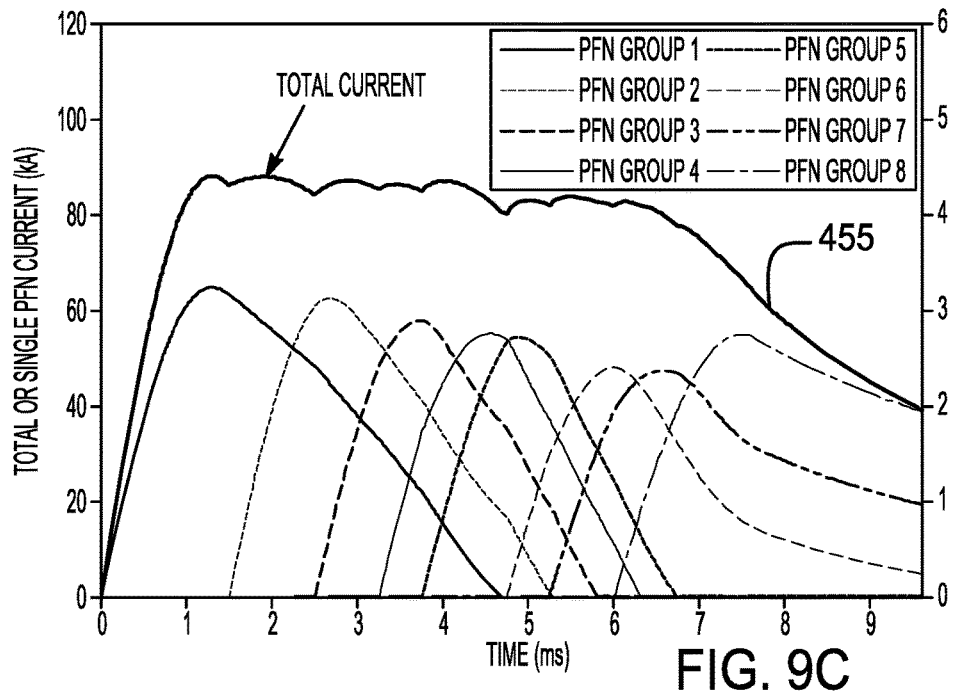
FIG. 9C shows an example of output load/armature current for the power transfer system of FIG. 3.

FIG. 9B shows an example of performance of a DFIM electrical machine charging for a single-stage 7.98 kJ 41,000 µF pulse forming network (PFN) to 624 VDC in 0.30 seconds and showing machine AC current output which peaks at 258 Amps and incremental AC output voltage controlled by machine excitation. From top to bottom FIG. 9B shows, as a function of time, AC output voltage, output current, PFN DC voltage, and PFN energy. FIG. 9C shows an example of output load/armature current (top line) 455 which is principally constant-current produced by a larger array of 8 PFN stages each triggered in sequence by solid-state switch action, all represented as a function of time. The output current in this example is substantially constant for 5.5 seconds.

FIG. 10 shows an example of a four-stage pulse forming network (PFN), some of which is shown in U.S. Pat. No. 9,705,314, the description and figures of which are incorporated by reference, having a further feature of an additional higher impedance closed loop which circulates induced fault current $i_5$ through inductance and resistance combination Lx and Rx to limit overall fault energy in main currents $i_1$ through $i_4$. The positive and negative busses shown are feeding a pulsed electromagnetic effector as the final load (e.g. 224, 226, 228 in FIG. 3). The purpose of this figure is to show a potential intermediate load for a DFIM machine (such as 274, 276 or 278 in FIG. 3) that may be composed of four separately regulated DFIM outputs feeding this four-stage PFN which connect to charging inputs at capacitors C1-C4.

Figure 11:
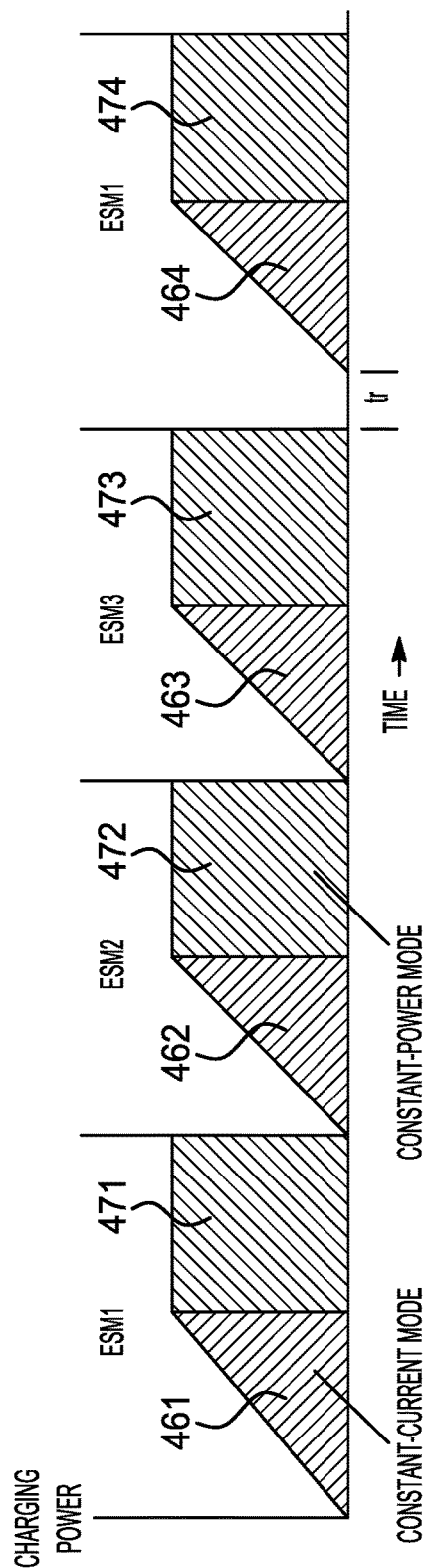
FIG. 11 is a diagram schematically illustrating power supplying from a prior art system.
Figure 12:
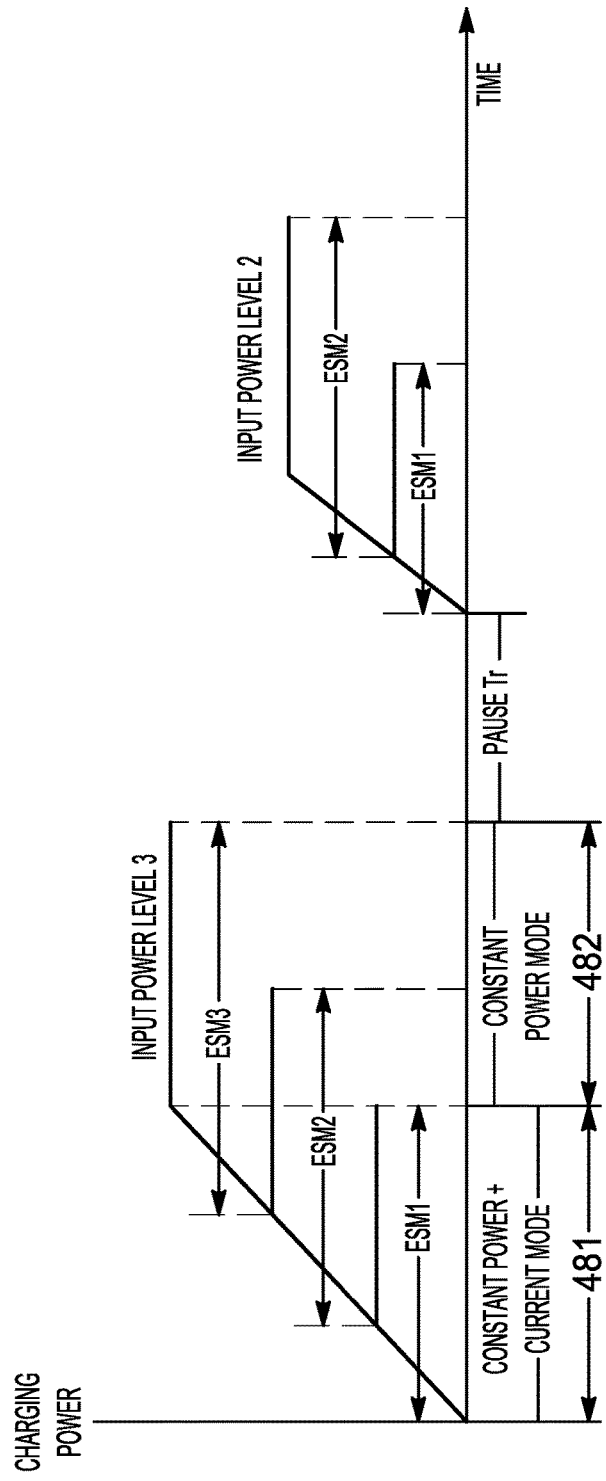
FIG. 12 is a diagram schematically illustrating power supplying from a power transfer system of the present invention.

FIG. 11 shows an example of a prior art charging cycle, with individual constant-current modes 461, 462, 463, and 464, followed sequentially by respective constant-power modes 471, 472, 473, and 474. By contrast FIG. 12 shows an example of charging using the power transfer system described herein, with combined constant-current modes and constant-power modes overlapping, such as in time period 481, when all ESMs must be recharged simultaneously followed by a limited number of ESMs being charged thereafter in time period 482.

Figure 13:
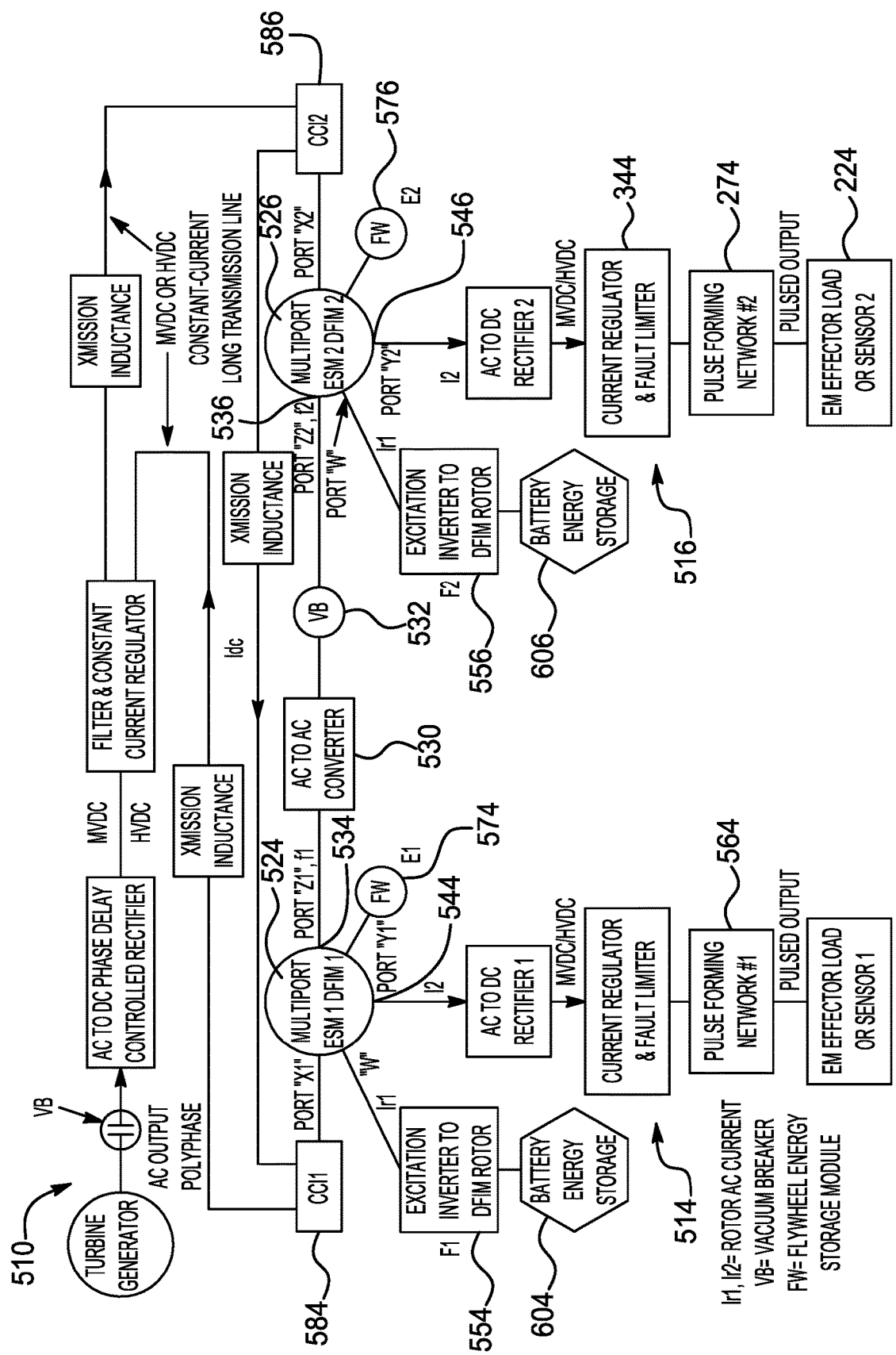
FIG. 13 is a schematic diagram of a power transfer system in accordance with another alternate embodiment of the invention.

An advantageous embodiment uses doubly-fed induction machines (DFIM) directly coupled to independent flywheel storage units in combination with a long-distance DC constant-current transmission line. FIG. 13 shows a power transfer system 510 that includes means of transferring energy from DFIM 524 to DFIM 526 or vice versa when one machine is discharged ahead of the other and it is desired to equalize stored energies among multiple ESMs. An AC-to-AC converter 530 provides bidirectional power flow between an ESM system 514 (which includes the DFIM 524) and an ESM system 516 (which include the DFIM 526). A circuit breaker 532, such as a vacuum breaker, is also between the DFIMs 524 and 526, in series with the converter 530. The DFIMs 524 and 526 have respective winding impedances $Z_1$ and $Z_2$ at windings 534 and 536. Both of the DFIMs 524 and 526 (which may be substantially identical) are capable of outputting a variable-frequency polyphase current. If the ESM 514 is run at speed higher than the ESM 516, the converter 530 changes its frequency to a lower frequency f so as to maintain slip on the winding of the ESM 516 that is operatively coupled to the converter 530, within a high efficiency range e.g. 1% to 5%. This frequency will be constantly regulated as machine speed changes. The converter 530 may be a conventional AC link converter, or alternatively an AC-DC-AC converter with input and output frequencies independent of each other.

In FIG. 13, respective output windings 544 and 546 of the DFIMs 524 and 526 are capable of providing both constant current and constant power output, depending on the mode of excitation of rotor current provided to rotors of the DFIMs 524 and 526. The rotor currents are independently controlled by respective inverters 554 and 556. If constant current output to a PFN, such as the PFNs 564 or 566, is required, the rotors of the DFIMs 524 and 526 are excited in a constant current mode and energy is extracted from flywheel energy storage 574 and 576. If constant power is desired, the rotor is excited in a constant power mode from the inverters 554 and 556, and energy may also be extracted from the flywheels 574 and 576, typically at a higher rate. The amplification factor is different for these different modes.

During the charging mode, independent of ramp rate, the same current is input to the DFIMs 524 and 526 from the respective DC-to-AC converters 584 and 586, since all machines in the main driving constant current loop have identical AC currents. If the respective flywheels 574 and 576 are at different energy levels at initiation of a charge, the difference in charging energy may be supplied by the excitation circuit through currents provided by the excitation inverters 554 and 556, to allow each flywheel set to attain equal stored energy capacity prior to the start of the output cycling. Battery energy storage sub-systems 604 and 606 supply the excitation inverters 554 and 556 respectively, and are capable of providing e.g. 2-15% of baseline output as required full excitation power. The energy storage sub-systems 604 and 606 may also (alternatively) be electrostatic ultra-capacitor banks. In addition to current regulation by the excitation inverters 554 and 556, the use of the windings 534 and 536 at ports $Z_1$ and $Z_2$ also allows transfer of energy among sets, to equalize all ESM inertial energy levels if desired.

The main energy transfer between the ESMs 514 and 516 occurs in two general modes. First, in a charging cycle from main source (a generator 512), small adjustments in energy delivered to each of the ESMs 514 and 516 are made by excitation system rotor-field current adjustments to the DFIMs 524 and 526, fed from the battery sources 604 and 606 through inverter subsystems 554 and 556, which provide DC to AC conversion. Current feedback for control of the DFIMs 524 and 526 is from a current sensor located on the DC line feeding the PFNs 564 and 566.

When the main charging cycle is complete, converters 584 and 586 are turned off, and major adjustments in stored energy in the ESMs 514 and 516 is made by controlling the current through bidirectional converter 530. This mode allows for sequential or non-sequential firing of PFNs 564 and 566 into loads. This use of two distinct operating scenarios in the charging apparatus shown in FIG. 13 allows high flexibility in use and application of the multiple ESMs 514 and 516.

Figure 14:
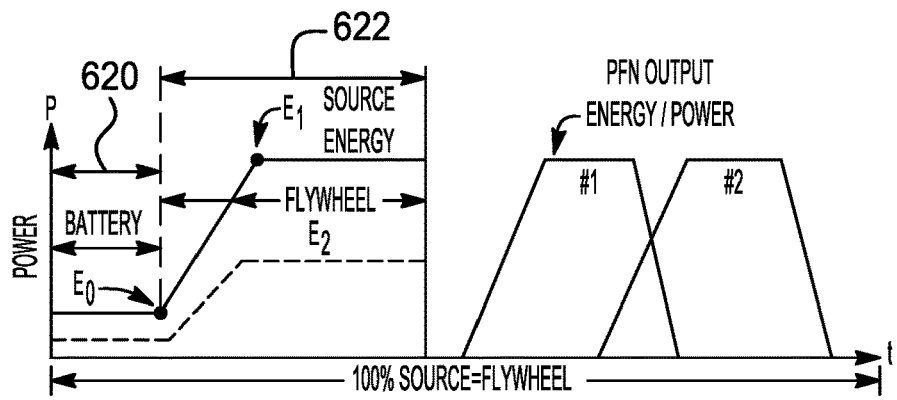
FIG. 14 is a diagram illustrating operation of a power transfer system in a first mode.

FIGS. 14-17 are power versus time plots that show source energy and energy output for various cases for use of systems described herein, for instance the power transfer system 510 (FIG. 13). FIG. 14 shows a basic use of the system, with all ESMs being charged simultaneously in a constant-current loop (mode) at equivalent rates and discharged, although sequentially, to approximately the same depth of discharge. In this mode all charging power from the source goes into flywheel and/or battery charging, energy being first stored in the batteries at 620 and then in the flywheels at 622.

Figure 15:
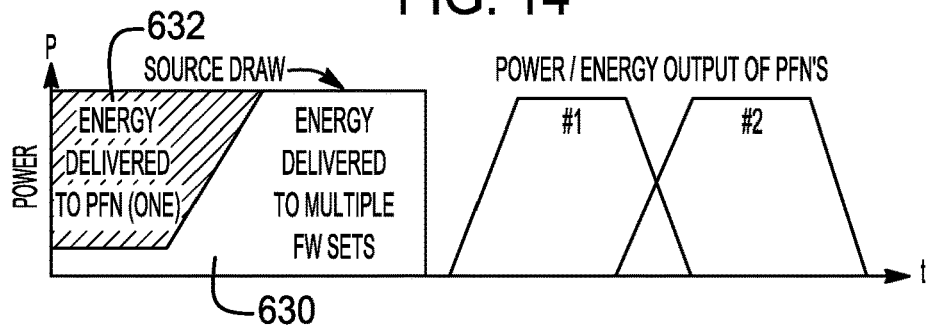
FIG. 15 is a diagram illustrating operation of a power transfer system in a second mode.

FIG. 15 shows a mixed-use case, wherein the configuration allows for the source charging power to be divided between charging the flywheel, at 630, and/or battery sub-systems providing power directly to the PFN storage capacitors, at 632, and ultimately to the output effectors. In this mixed configuration, there is no efficiency penalty on either main power system or the DFIM albeit the rate of energy delivery to the PFN is reduced in comparison to the flywheel providing energy to the output PFN.

Figure 16:
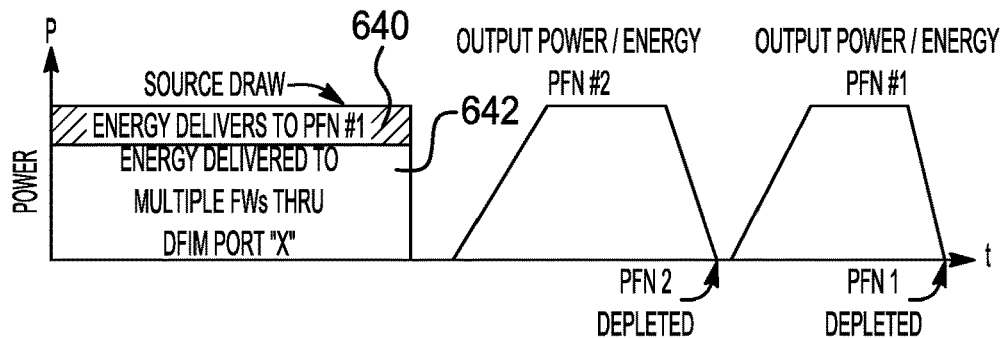
FIG. 16 is a diagram illustrating operation of a power transfer system in a third mode.

FIG. 16 shows a constant energy delivery to a multiple set of flywheels through in input winding, at 642, simultaneous with supplying one PFN a constant energy charge in the first time block, at 640. In first time block, the turbine generator is supplying constant energy to all combined loads. Subsequent energy delivery to PFN1 and PFN2 are ramped up and ramped down.

Figure 17:
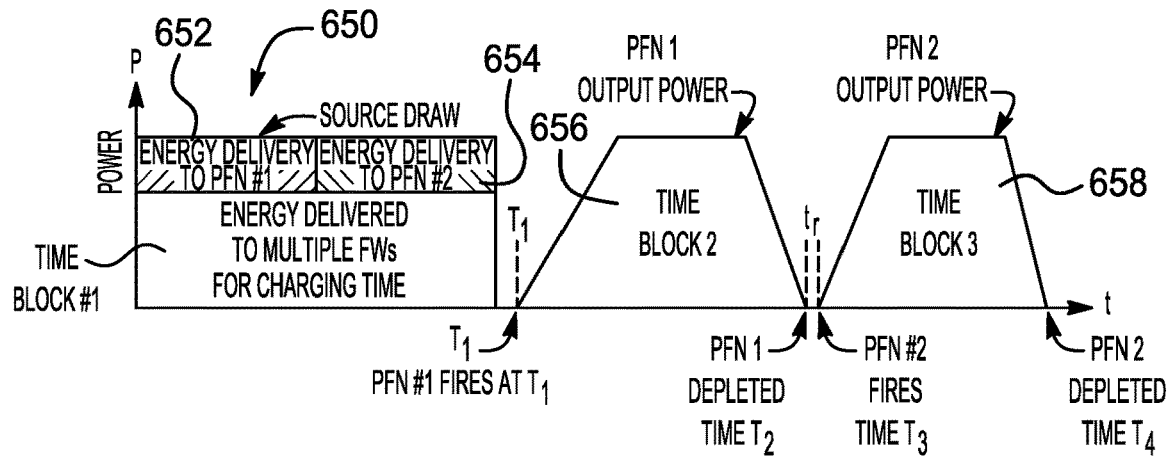
FIG. 17 is a diagram illustrating operation of a power transfer system in a fourth mode.

FIG. 17 shows a special case whereby the initial charge is divided in time block 650 between two PFNs, in addition to simultaneously delivering charging energy to multiple flywheel sets. The first PFN (PFN1) is charged up through this first time block, at 652, upon which time the same energy is diverted to the second PFN (PFN2), 654, and is charged at T1. Subsequent to the second PFN being charged up in block 654, and fired at T2, the repetitive cycle starts in time block 656 with the first PFN being ramped up in a fixed time period to attain full energy and then depleted at end of block 656, at time T3. PFN1 is left at zero state charge after 50% of time in time block 658. PFN2 is fully discharged at T4 at the end of time block 658. There is a rest period $t_r$ between the controlled ramp-up cycle with PFN2 attaining full charge in time block 658, and PFN1 being depleted in a controlled ramp-down.

Figure 18:
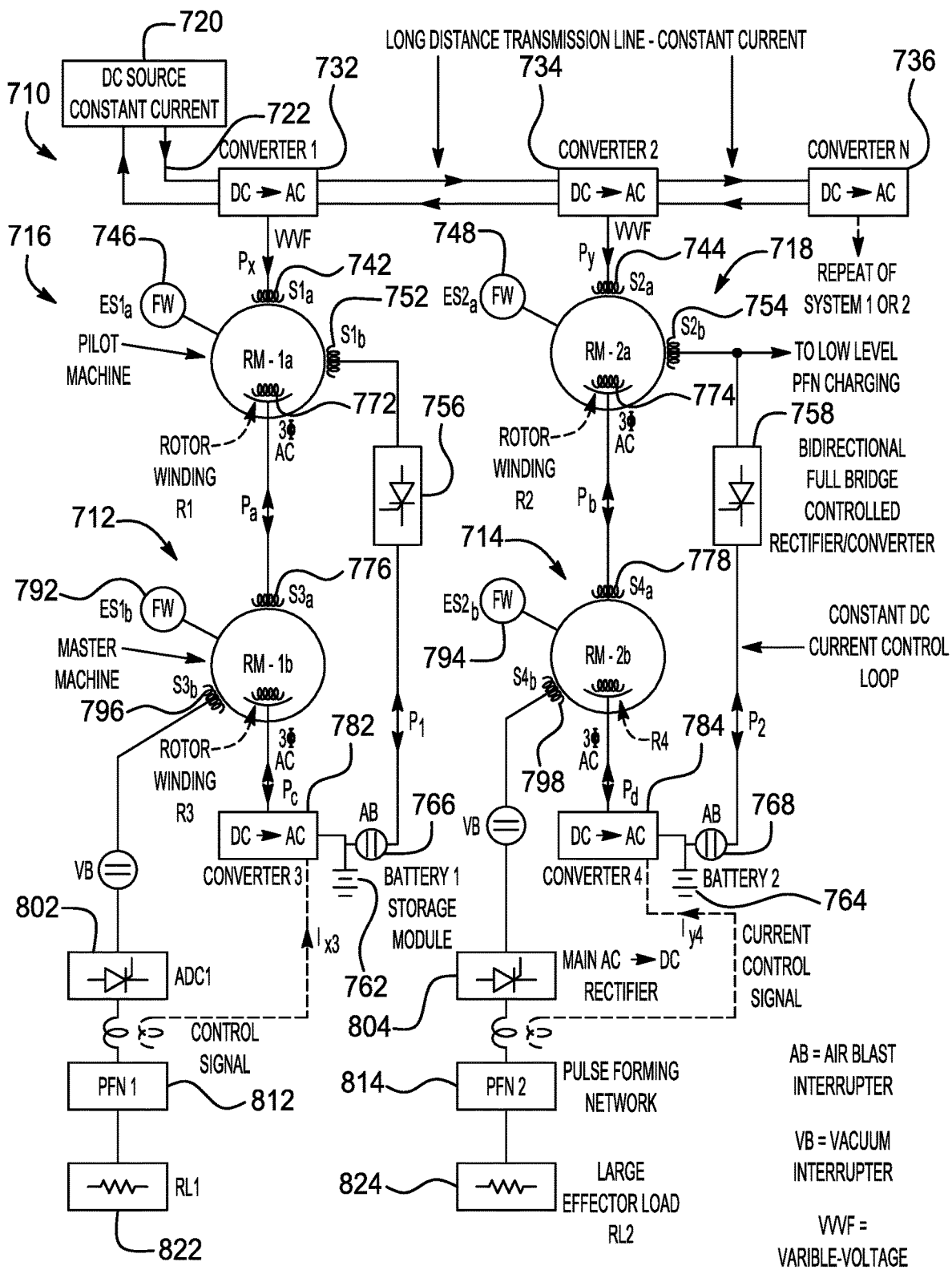
FIG. 18 is a schematic diagram of a power transfer system in accordance with yet another alternate embodiment of the invention.

FIG. 18 shows a detailed cascade arrangement of a power transfer system 710 with two master ESMs 712 and 714, and two pilot ESMs 716 and 718, in a four-machine system. The system 710 can be extended to any even number of machines. The cascade arrangement allows fast rise times to be attained with stochastic loads and minimizes expensive power conditioning apparatus. The primary supply is a constant-current DC source 720 with allowance for a long-distance DC transmission line 722 hooking multiple pilot machines 716 and 718 directly into the main current loop. Three main DC to AC converters 732, 734, and 736 are in FIG. 18. The converters 732-736 provide VVVF power to the stator windings such as the stator windings 742 and 744. The pilot machines 716 and 718 have small flywheels 746 and 748. The AC output from the stators 752 and 754 is rectified at rectifiers 756 and 758, and feeds each battery energy storage subsystem (ultra-capacitors or batteries) 762 and 764 through air-blast DC breakers 766 and 768. The pilot machines 716 and 718 also generates through their rotor polyphase windings 772 and 774, power Pa and Pb sent to the main input stator windings 776 and 778 of the master machines 712 and 714, without need for frequency conversion apparatus. Excitation of the master machines 712 and 714 is through DC-to-AC VVVF converters 782 and 784, with the power source for the excitation either battery power or a direct feed from the pilot machines.

The master machines 712 and 714 have major flywheels 792 and 794 directly coupled to them. The main output of the master machines 712 and 714 are stator windings 796 and 798, which feed main AC-to-DC rectifiers 802 and 804. Therefore PFNs 812 and 814 are directly charged by these rectifiers, which in a preferred embodiment are phase-delay thyristor rectifiers capable of both high voltage and high current operation. The PFNs 812 and 814 or multiple stages thereafter feed load circuits 822 and 824, which may be inductive-resistive loads or resistive-inductive-capacitive loads representing the EM effectors. The system 710 as a whole can accommodate non-linear loads EM effector loads, for example loads which have both a time-dependent resistive and a time-dependent inductance characteristic. This system effectively buffers the input power source from rapid load pulsations and minimizes the peak current carried by the transmission line.

Figure 19:
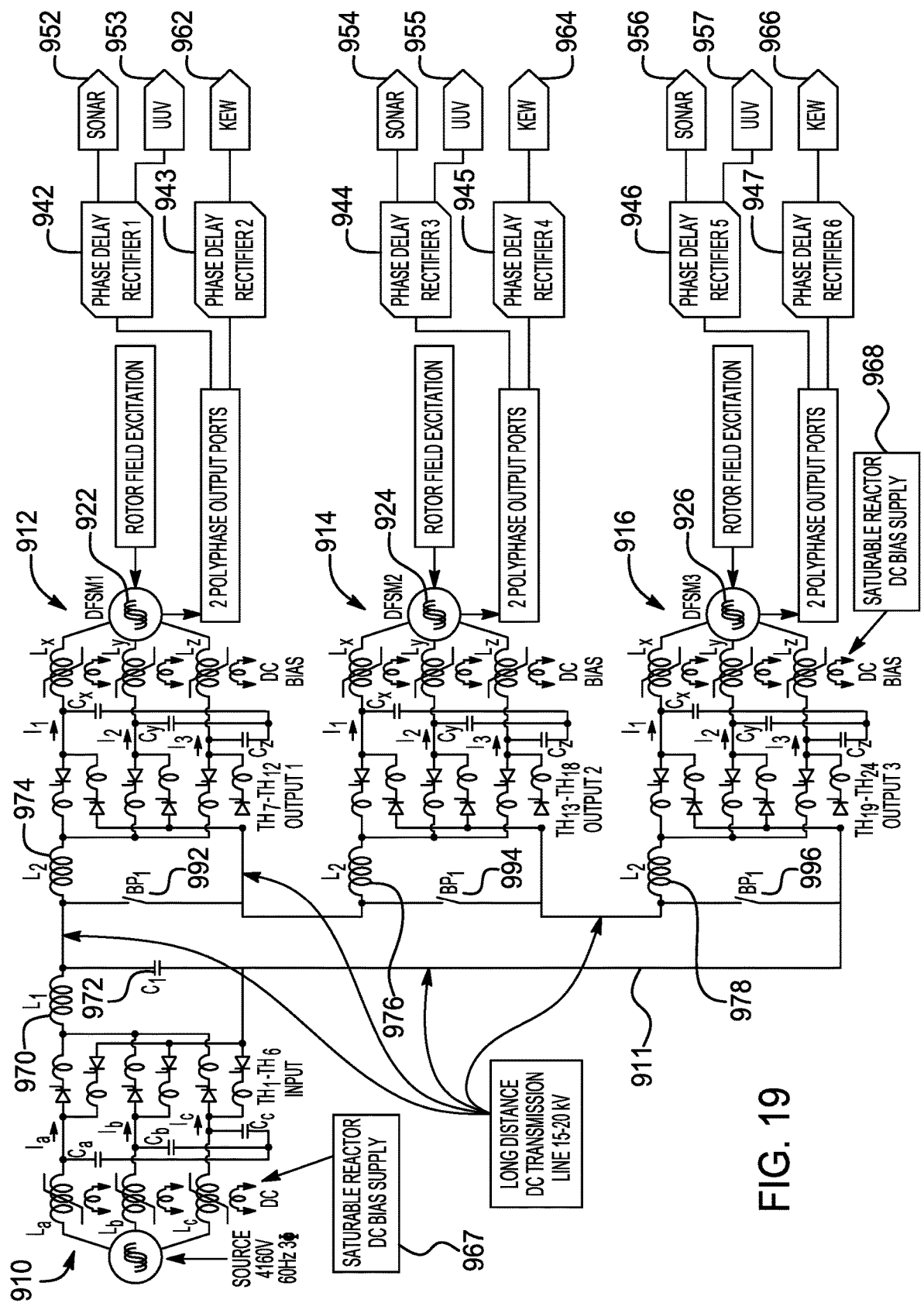
FIG. 19 is a schematic diagram of a power transfer system in accordance with still another alternate embodiment of the invention.

FIG. 19 shows an embodiment power transfer system 910 where electric power is generated onshore then converted to either DC or low frequency AC, transmitted over a long distance line 911 to the seabed and powering multiple power conversion modules 912, 914, and 916. The modules 912-916 individually operate doubly-excited electrical synchronous machines (DFSMs) 922, 924, and 926. Each DFSM is equipped with an integral flywheel energy storage unit (ESU) and in addition use a rotor field excitation supply which has a smaller amount of stored energy through a battery or ultra-capacitor DC supply. Each DFSM is equipped with a separate input stator winding receiving power from the high voltage transmission line and multiple output stator windings which are designed to feed a multiplicity of loads. The DFSM output winding ports may be completely or partially rectified, such as by reference phase delay rectifiers 942, 943, 944, 945, 946, and 947 to produce a multiplicity of DC power outputs to feed loads such as sonar systems, unmanned underwater vehicles (UUVs), and kinetic energy weapons (KEWs), to give a few non-limiting examples.

In FIG. 19 the phase delay rectifiers 942, 944, and 946 are producing a low voltage DC output to sonar systems 952, 954, and 956, and UUVs 953, 955, and 957. The phase delay rectifiers 943, 945, and 947 produce a medium voltage DC pulsed power output for operation of a kinetic energy weapon or electromagnetic effector 962, 964, and 966 such as inductive torpedo launcher.

In the system 910 the DFSM ports feeding the phase delay rectifiers 942, 944, and 946 have a fundamentally different electrical time constant and different impedance level than the DFSM ports feeding the phase delay rectifiers 943, 945, and 947. However all output ports derive pulsed energy from the same source in each set, which is the flywheel. In so doing the DFSMs 922, 924, and 926 avoid large energy or power surges to appear on the incoming high voltage transmission line. Transient energy is extracted from the inertial/flywheel source rather than being extracted from the power source, and thus the power source is buffered from rapidly rising or falling load energy swings.

Control of power, current, and voltage may be effected by two different means, mechanisms, or methods. In the first the phase delay rectifiers 942-947 reduce the magnitude of the DFSM output voltage and also completely cutting off power if the need arises such as short circuit condition. In the second approach the most broad-ranging control of voltage, power, and current is through the action of the rotor field excitation controllers 962, 964, and 966, in which is variable-voltage variable-frequency (VVVF) inverters have DC inputs derived from the main transmission line input. The VVVF drives a low frequency polyphase input to the DFSM rotor which in part compensates for the drop in rotor-flywheel speed during a discharge event and in boosting rotor frequency allows the stator output ports to maintain a nearly constant output frequency, albeit a much higher frequency than the rotor circuit.

FIG. 19 shows an AC link input converter at the source and three AC link output converters feeding each electrical machine. This arrangement is useable in power transfer systems described above, and is advantageous since the overall circuitry provides for efficient series stacking of identical output converters. The AC link converters include saturable DC-bias controlled reactors 967 and 968 inserted in series in both input and output converters connecting to either the source generator and to the DFSM input terminals. The reactors 967 and 968 assist in constant current regulation in a long transmission line.

The system 910 is well suited to a high voltage DC or AC transmission whereby it is advantageous to operate the transmission line as constant current system with voltage and current regulation being performed by the source converter. Inductor 970 represents the transmission line principal inductance and 972 is the shunt line capacitance. The inductors 974, 976, and 978 represent the portion of the transmission line 911 close to each subsea station. The output converters take a constant-current input power and operates the electrical machine in either a constant-current or constant-voltage mode for the purpose of accelerating the machinery in either a constant-power mode or a constant-current mode for constant torque acceleration. In the preferred embodiment, the DFSM is first started from zero speed as a constant-current input then upon reaching base speed the converter reverts to a constant power model. As used herein, the base speed is the lowest speed that the flywheel will normally operate at its maximum discharge point; for speed increases beyond base speed and up to maximum speed the machine is in a "field weakening" mode whereby the magnetic flux/pole is reduced yet output power remains constant. The frequency boost to the rotor excitation circuit is in direct inverse proportion to the Flywheel shaft speed; this allows overall output frequency to be nearly constant over entire discharge cycle. The DFSM utilizes what is known in prior art as "field oriented vector" control for torque, power and speed regulation.

The output converter DC-bias saturable reactors in each phase are necessary to help provide current regulation of the DFSM in addition to basic frequency and current regulation provided by the converters. In an experimental saturable reactor built by Raytheon for a 5000 Volt AC power system and 1 MW rating; a variable inductance range of 60:1 was obtained with a DC saturable reactor operated from a 1-100 Amp DC power supply for control. For example if the transmission line suddenly reverts to powering only two stations instead of three, then each remaining saturable reactor can be set to a 33% higher inductance value within a few milliseconds by control of the DC excitation current to the saturable reactors. This mode of control is well known in prior art. It is clear that the number of subsea stations can be any number without limitation provided the input applied voltage is high enough to allow for transmission line inductances over 1.0 Henry and voltage reactance drops of under 30% to be implemented.

Each subsea unit is provided with a bypass switch 992, 994, and 996, which shunts each converter or DFSM in the event of a catastrophic device failure. Due to the high series inductance of the series transmission line, the most efficient way to transmit large blocks of power is with a constant current system, for which inductances covering distances of 10-100 km are still practical. For example with a system designed with a 25 kV transmission input voltage, and operated at low frequency AC input even if the line reactive drop is 3 kV or 12% drop, this still constitutes a practical system. If 3 subsea stations are series connected on a 25 kV line and with a 3 kV line drop then each station is receiving at least 7.2 kV which becomes the VVVF inverter input voltage level.

The system 910 provides buffering of the input power source from pulsating loads due to the combined action of the energy storage flywheel and DFSM basic characteristics. For example if the final output load is pulsing at a rate of 20 MW/s, the source generator can be buffered to limit source power to a slew rate of 0.5 MW/s which extends lifetime of the machinery and reduces the size/cost of the transmission line "tether" cable to a minimum. Thus a 40:1 buffering ratio is practical at the megawatt power level. Features described herein make this practical for a subsea wide-ranging system of energy modules that operate essentially independent of the shore power source. The shore power can be a gas-turbine generator, a solar array, wind generator, ocean wave kinetic generator or ocean thermo-electric generator.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power transfer system comprising:
   a DC power source; and
   multiple electro-dynamic conversion devices operatively coupled in series to the DC power source;
   wherein the multiple electro-dynamic conversion devices are configured to receive constant-current AC input from the DC power source through a DC-to-AC converter, such that output electric power from one of the multiple electro-dynamic conversion devices passes through a rectifier and an additional DC-to-AC converter to provide variable-frequency polyphase AC input to another of the multiple electro-dynamic conversion devices;
   wherein the multiple electro-dynamic conversion devices have a hybrid arrangement of energy storage of inertial energy storage and electro-chemical energy storage; and
   wherein the multiple electro-dynamic conversion devices are configured to provide simultaneously both constant-current AC output at a first output port, and constant-voltage AC output at a second output port that is electrically isolated from the first output port, drawing on energy from the DC power source, and on energy from the inertial energy storage and the electro-chemical energy storage, to compensate for load variations in the multiple electro-dynamic conversion devices.

2. The power transfer system of claim 1, wherein the constant-current AC output from the first output port, and the constant-voltage AC output from the second output port, are rectified to produce both constant-current DC output and constant-voltage DC output.

3. The power transfer system of claim 2, wherein the inertial energy storage includes flywheels operatively coupled to the electro-dynamic conversion devices; and wherein the electro-chemical energy storage is also operatively coupled to the electrodynamic conversion devices, for providing bidirectional slip energy excitation power.

4. The power transfer system of claim 3, wherein the electro-dynamic conversion devices are induction machines with a wound-field primary winding and multiple wound-field secondary windings.

5. The power transfer system of claim 4, wherein the induction machines are wound-rotor induction machines including polyphase AC rotor circuits excited by a variable-frequency variable-voltage AC excitation power supply.

6. The power transfer system of claim 1, wherein the power source is a combination of a power generator and an electronic regulator that provides for constant-current regulation of output power.

7. The power transfer system of claim 1, wherein at least one of the multiple electro-dynamic conversion devices has a relatively low impedance output, and at least another of the multiple electro-dynamic conversion devices has a relatively high impedance output.

8. The power transfer system of claim 1, further comprising:
   a transmission line connecting the multiple electro-dynamic conversion devices in series; and
   one or more bypass switches that allow selective bypass of one of the multiple electro-dynamic conversion devices, and that permit continuous operation of transmission lines and the power transfer system without interruption.

9. The power transfer system of claim 1, further comprising:
   a transmission line for transmitting the DC power to the DC-to-AC converter to convert DC output from the DC power source to the AC input received by the multiple electro-dynamic conversion devices.

10. The power transfer system of claim 9, wherein the transmission line is bidirectional and is configured to receive electrical power from the multiple electro-dynamic conversion devices and transfer the electrical power back to the power source, thereby to aid in reducing peak power draw from the power source.

11. The power transfer system of claim 9, wherein the transmission line is at least 500 m long.

12. The power transfer system of claim 9, wherein the transmission line is at least partially underwater.

13. A method of transferring power, wherein the method comprises:
   converting constant-current DC power supplied by a power source into constant-current AC power;
   transferring the constant-current AC power to multiple electro-dynamic conversion devices coupled together in series, such that output electric power from one of the multiple electro-dynamic conversion devices passes through a rectifier and a DC-to-AC converter to provide variable-frequency polyphase AC input to another of the multiple electro-dynamic conversion devices;

storing kinetic energy in electrical-machine-inertial energy storage and storing electro-chemical energy in electro-chemical energy storage of the multiple electro-dynamic conversion devices; and simultaneously providing constant-current at a first output port, and constant-voltage output at a second output port that is electrically isolated from the first output port, from the multiple electro-dynamic conversion devices, wherein the providing the output includes drawing energy from the power source, and on energy from the electrical-machine-inertial energy storage and the electro-chemical energy storage, to compensate for load variations in the multiple electro-dynamic conversion devices.

14. The method of claim 13, further comprising bidirectionally transferring energy from one of the multiple electro-dynamic conversion devices to another of the multiple electro-dynamic conversion devices.

15. A power transfer system comprising:
a power source; and
multiple electro-dynamic conversion devices operatively coupled in series to the power source, such that output electric power from one of the multiple electro-dynamic conversion devices passes through a rectifier and a DC-to-AC converter to provide variable-frequency polyphase AC input to another of the multiple electro-dynamic conversion devices;

wherein the multiple electro-dynamic conversion devices include two pairs of the multiple electro-dynamic conversion devices coupled in series, with each of the pairs including a master doubly-fed induction machine (DFIM), and a pilot DFIM operatively coupled together, and respective inertial energy storage devices operatively coupled to the master DFIM and the pilot DFIM.

16. The power transfer system of claim 15, wherein each of the multiple electro-dynamic conversion devices further has an electrochemical energy storage device operatively coupled to the master DFIM and the pilot DFIM.

17. The power transfer system of claim 15, wherein each of the multiple electro-dynamic conversion devices has an ultracapacitor energy storage device operatively coupled to the master DFIM and the pilot DFIM.

18. The power transfer system of claim 15, wherein the pilot DFIMs have rotor polyphase windings that provide input power to stator windings of respective of the master DFIMs, and that provide an amplification of power.

19. The power transfer system of claim 18, wherein output from the stator windings of the master DFIMs is sent to rectifiers of respective of the multiple electro-dynamic conversion devices, wherein power and energy are delivered to an array of pulse-forming networks feeding a load circuit.

* * * * *